Patented July 30, 1946

2,404,788

UNITED STATES PATENT OFFICE 2,404,788

POLYMERIZING OLEFINS

Robert E. Burk and Everett C. Hughes, Cleveland Heights, Ohio, assignors to The Standard Oil Company, Cleveland, Ohio, a corporation of Ohio No Drawing. Application October 22, 1941, Serial No. 416,104

12 Claims. (Cl. 260—683.15)

This invention relates to polymerization, such as by halides. In polymerizing olefins, it has been usual to employ in addition to a halide catalyst, a promoter closely allied to the catalyst in chemical composition, a common practice involving, for instance, boron fluoride, and a hydrogen halide promoter. We have now found that superior results may be obtained by application of agents which we find act as promoters in the sense of assisting the action of the catalyst, but which are heterogeneous or non-miscible and are chemically quite unrelated to halide catalysts.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

The materials to be polymerized may be any olefin as desired, as ethylene, propylene, butenes, or higher olefins, and the polymerization may be applied to relatively pure olefins or any mixture. The olefins may be diluted with the corresponding paraffins or with other inert hydrocarbons. Fractionated refinery gases containing both paraffins and olefins may be used, for instance, without separation. The catalyst is of the halide type, for instance, boron fluoride. And, with the catalyst, in accordance with the present invention, there is applied an agent which is heterogeneous with respect thereto and which is an oxygen-containing compound of an element of atomic numbers 13, 14, and 22-28 inclusive, of the periodic table. Of the first mentioned, we prefer aluminum silicates, such as active clays, illustrated by "floridin," and alumino-silicates, illustrated by "filtrol," also alumina, silica, etc.

The polymerizing operation is carried out with pressures up to 300 pounds per square inch, and temperatures of 0-120° F., preferably about 80° F. The boron fluoride as a catalyst is ordinarily supplied in amount of 0.2-25 mol per cent of the olefin feed. The heterogeneous agent as above noted is supplied also in amount of 0.05-5 mol per cent based on the olefin. In some cases we prefer to include with the heterogeneous agent acting as promoter, a minor amount of an inorganic salt, particularly a salt of a strong acid, as for instance, potassium chloride, zinc chloride, aluminum sulphate, etc. It is preferred also to have from 0.3 to 4 mols of water per mol of oxide promoter. This hydration may be attained by either passing water-saturated air or inert gas over the oxide, or by controlled drying of the wet solid or precipitate. More particularly illustrating the heterogeneous type of agent which we employ as promoters, are the following:

Aluminum silicates in the form of active clays, as "floridin."
Acid activated alumino-silicates, such as "filtrol."
Alumina, as precipitated alumina, bauxite, "alundum."
Silica, as silica gel.
Oxides of iron, prepared by precipitation, or natural, as limonite.
Oxides of nickel.
Oxides of chromium, as CrO, $Cr_2O_3$ prepared by precipitation, or as Guignet's green. This may be mixed with aluminum oxide.
Oxides of titanium, manganese, cobalt, vanadium, and phosphorus.

In cases where salts are deposited on the promoter agent, the amount may be in general around 10% by weight with respect to the promoter.

As an example: Propylene 37.4 mol per cent in propane is subjected to the action of boron fluoride at 180 pounds pressure per square inch, and a silicate in the form of Utah clay 0.3 mol per cent at a temperature of 80° F. After two and one-half hours the product yield was 74.6% of the charge, and at atmospheric pressure 35.6% boiling above 500° F. was taken off, and having a viscosity of 57 centistokes, and viscosity index 122.5, and under vacuum of 15 mm. of mercury 19.1% of the product was taken off which boiled above 395° F. and had a viscosity of 1580 centistokes and viscosity index 11.9.

As another example: A similar olefin stock treated with similar catalysts and temperature and pressure conditions, but with 1 mol per cent of alumina and 0.335 of water, gave a yield of 98.6%, of which at atmospheric pressure 89.8% boiled above 500° F. and had a viscosity of 15.3 centistokes and a viscosity index 93.4, and at 15 mm. mercury 32.9% of the product boiled above 395° F., and had a viscosity of 92 centistokes and viscosity index 75.1.

As another example: With similar olefin and halide catalyst and treatment, but with 1 mol per cent of Utah clay, containing 12.3% of water and 10% of KCl, a yield of 66% was obtained, of which 28.8% boiled above 500° F. at atmospheric pressure and had a viscosity of 33.9 centistokes and viscosity index 131.2, and at 15 mm. mercury 12.2% of the product boiled above 395° F., and had a viscosity of 1800 centistokes.

As another example: With similar stock and conditions, except with application of 1 mol per cent of $Al_2O_3$ containing 25.9% of water and 10% of $Al_2(SO_4)_3$ as promoter, a yield of 100% was obtained, of which 68.1% boiled above 500° F. at atmospheric pressure and had a viscosity of 13.6 centistokes and viscosity index 94.6, and at 15 mm. mercury 14.1% of the product boiled above 395° F., and had a viscosity of 561 centistokes and viscosity index 82.3.

Other modes of applying the principle of the invention may be employed, change being made as regards the details described, provided the features stated in any of the following claims, or the equivalent of such, be employed.

We therefore particularly point out and distinctly claim as our invention:

1. A process of the character described, which comprises contacting an olefin with 0.2 to 25 mol per cent (based on the olefin) of boron fluoride as the catalyst for polymerizing the olefin, while promoting the catalytic activity of the boron fluoride with 0.05 to 5 mol per cent (based on the olefin) of an oxygen-containing compound of an element from the third series of the periodic classification selected from the group consisting of elements having atomic numbers of 13 and 14, the amount of the oxygen-containing promoter being less than the amount of the boron fluoride.

2. A process of the character described which comprises contacting an olefin with 0.2 to 25 mol per cent (based on the olefin) of boron fluoride as the catalyst for polymerizing the olefin, while promoting the catalytic activity of the boron fluoride with 0.05 to 5 mol per cent (based on the olefin) of an oxygen-containing compound of an element from the third series of the periodic classification selected from the group consisting of elements having atomic numbers of 13 and 14, the amount of the oxygen-containing promoter being less than the amount of the boron fluoride, together with a minor amount of a salt of a strong acid.

3. A process of the character described, which comprises contacting an olefin with 0.2 to 25 mol per cent (based on the olefin) of boron fluoride as the catalyst for polymerizing the olefin, while promoting the catalytic activity of the boron fluoride with 0.05 to 5 mol per cent (based on the olefin) of an oxygen-containing compound of an element from the third series of the periodic classification selected from the group consisting of elements having atomic numbers of 13 and 14, the amount of the oxygen-containing promoter being less than the amount of the boron fluoride, together with 0.3 to 4 mols of water per mol of the oxygen-containing promoter.

4. A process of the character described, which comprises contacting an olefin with 0.2 to 25 mol per cent (based on the olefin) of boron fluoride as the catalyst for polymerizing the olefin, while promoting the catalytic activity of the boron fluoride with 0.05 to 5 mol per cent (based on the olefin) of an oxygen-containing compound of an element from the third series of the periodic classification selected from the group consisting of elements having atomic numbers of 13 and 14, the amount of the oxygen-containing promoter being less than the amount of the boron fluoride, together with 0.3 to 4 mols of water per mol of the oxygen-containing promoter and a minor amount of a salt of a strong acid.

5. A process of the character described, which comprises contacting an olefin with 0.2 to 25 mol per cent (based on the olefin) of boron fluoride as the catalyst for polymerizing the olefin, while promoting the catalytic activity of the boron fluoride with 0.05 to 5 mol per cent (based on the olefin) of an active clay, the amount of the clay promoter being less than the amount of the boron fluoride.

6. A process of the character described, which comprises contacting an olefin with 0.2 to 25 mol per cent (based on the olefin) of boron fluoride as the catalyst for polymerizing the olefin, while promoting the catalytic activity of the boron fluoride with 0.05 to 5 mol per cent (based on the olefin) of an active clay, the amount of the clay promoter being less than the amount of the boron fluoride, together with a minor amount of a salt of a strong acid.

7. A process of the character described, which comprises contacting an olefin with 0.2 to 25 mol per cent (based on the olefin) of boron fluoride as the catalyst for polymerizing the olefin, while promoting the catalytic activity of the boron fluoride with 0.05 to 5 mol per cent (based on the olefin) of an active clay, the amount of the clay promoter being less than the amount of the boron fluoride, together with a minor amount of potassium chloride.

8. A process of the character described, which comprises contacting an olefin with 0.2 to 25 mol per cent (based on the olefin) of boron fluoride as the catalyst for polymerizing the olefin, while promoting the catalytic activity of the boron fluoride with 0.05 to 5 mol per cent (based on the olefin) of an active clay, the amount of the clay promoter being less than the amount of the boron fluoride, together with 0.3 to 4 mols of water per mol of clay.

9. A process of the character described, which comprises contacting an olefin with 0.2 to 25 mol per cent (based on the olefin) of boron fluoride as the catalyst for polymerizing the olefin, while promoting the catalytic activity of the boron fluoride with 0.05 to 5 mol per cent (based on the olefin) of an active clay, the amount of the clay promoter being less than the amount of the boron fluoride, together with 0.3 to 4 mols of water per mol of clay and a minor amount of a salt of a strong acid.

10. A process of the character described, which comprises contacting an olefin with 0.2 to 25 mol per cent (based on the olefin) of boron fluoride as the catalyst for polymerizing the olefin, while promoting the catalytic activity of the boron fluoride with 0.05 to 5 mol per cent (based on the olefin) of an active clay, the amount of the clay promoter being less than the amount of the boron fluoride, together with 0.3 to 4 mols of water per mol of clay and a minor amount of potassium chloride.

11. A process of the character described, which comprises contacting an olefin with 0.2 to 25 mol per cent (based on the olefin) of boron fluoride as the catalyst for polymerizing the olefin, while promoting the catalytic activity of the boron fluoride with 0.05 to 5 mol per cent (based on the olefin) of alumina, the amount of the alumina promoter being less than the amount of the boron fluoride.

12. A process of the character described, which comprises contacting an olefin with 0.2 to 25 mol per cent (based on the olefin) of boron fluoride as the catalyst for polymerizing the olefin, while promoting the catalytic activity of the boron fluoride with 0.05 to 5 mol per cent (based on the olefin) of alumina, the amount of the alumina promoter being less than the amount of the boron fluoride, together with 0.3 to 4 mols of water per mol of alumina.

ROBERT E. BURK.
EVERETT C. HUGHES.